(12) United States Patent
Saleh et al.

(10) Patent No.: US 9,392,518 B1
(45) Date of Patent: Jul. 12, 2016

(54) METHOD AND SYSTEM FOR CONTROLLING A CIRCUIT-SWITCHED FALLBACK PROCESS

(71) Applicant: Sprint Spectrum L.P., Overland Park, KS (US)

(72) Inventors: Ahmad N. Saleh, Overland Park, KS (US); Deveshkumar Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/837,497

(22) Filed: Aug. 27, 2015

(51) Int. Cl.
*H04W 36/14* (2009.01)
*H04W 36/30* (2009.01)
*H04W 36/32* (2009.01)
*H04W 68/00* (2009.01)
*H04W 24/10* (2009.01)
*H04W 36/22* (2009.01)
*H04W 88/08* (2009.01)
*H04W 88/06* (2009.01)

(52) U.S. Cl.
CPC ............. *H04W 36/14* (2013.01); *H04W 24/10* (2013.01); *H04W 36/22* (2013.01); *H04W 36/30* (2013.01); *H04W 36/32* (2013.01); *H04W 68/005* (2013.01); *H04W 88/06* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 8,265,627 B2 | 9/2012 | Ergen et al. | |
| 2008/0070576 A1 | 3/2008 | Sanders et al. | |
| 2010/0202413 A1 | 8/2010 | Vikberg et al. | |
| 2010/0317375 A1 | 12/2010 | Burbidge et al. | |
| 2011/0149907 A1 | 6/2011 | Olsson et al. | |
| 2012/0028661 A1 | 2/2012 | Fang et al. | |
| 2012/0064885 A1 | 3/2012 | Ramachandran et al. | |
| 2013/0028081 A1* | 1/2013 | Yang | H04W 48/20 370/230 |
| 2013/0322238 A1* | 12/2013 | Sirotkin | H04W 28/0247 370/230 |
| 2014/0078898 A1 | 3/2014 | Anchan et al. | |
| 2014/0348014 A1 | 11/2014 | Teshima et al. | |

OTHER PUBLICATIONS

Qualcomm Incorporated, "Circuit-switched fallback. The first phase of voice evolution for mobile LTE devices," White Paper, 2012.
Tanaka et al., "CS Fallback Function for Combined LTE and 3G Circuit Switched Services," NTT DOCOMO Technical Journal, vol. 11, No. 3, Sep. 2009.
Qualcomm Technologies Incorporated, "Circuit-switched fallback to 1x voice: Network architecture, options and performance," White Paper, 2013.

* cited by examiner

*Primary Examiner* — Leon-Viet Nguyen (57) ABSTRACT

A method and system for controlling a circuit-switched fallback (CSFB) process is disclosed. A first wireless network serving a wireless communication device (WCD) receives from an interworking server an indication of an incoming call that the WCD can receive via a second wireless network. The first wireless network sends the interworking server an indication of a location related to the WCD. The interworking server determines a load level of the second wireless network in an area proximate the indicated location. The interworking server selects a control message based on the load level and sends the selected control message to the first wireless network. The first wireless network determines whether to transition the WCD to the second wireless network to receive the incoming call based on the selected control message from the interworking server.

20 Claims, 5 Drawing Sheets

METHOD AND SYSTEM FOR CONTROLLING A CIRCUIT-SWITCHED FALLBACK PROCESS

BACKGROUND

In a typical cellular radio communication system (wireless communication system), an area is divided geographically into a number of cell sites, each defined by a radio frequency (RF) radiation pattern from a respective antenna or antenna system. The antennas in the cells are in turn coupled to a controller, which is then coupled to a telecommunications switch or gateway, such as a mobile switching center (MSC) and/or a packet data serving node (PDSN) for instance. These (and possibly other) elements function collectively to form a Radio Access Network (RAN) of the wireless communication system. The switch or gateway may then be coupled with a transport network, such as the public switched telephone network (PSTN) or a packet-switched network (e.g., the Internet).

Depending on the specific underlying technologies and architecture of a given wireless communication system, the RAN elements may take different forms. In a code division multiple access (CDMA) system configured to operate according to IS-2000 and IS-856 standards, for example, the antenna system is referred to as a base transceiver system (BTS), and is usually under the control of a base station controller (BSC). In a universal mobile telecommunications system (UMTS) configured to operate according to Long-Term Evolution (LTE) standards, the antenna system is usually referred to as a NodeB or an eNodeB, and the entity that typically coordinates functionality between multiple eNodeBs is usually referred to as a mobility management entity (MME). Other architectures and operational configurations of a RAN are possible as well.

A subscriber (or user) may access the wireless communication system for communication services via a wireless communication device (WCD), such as a cellular telephone, "smart" phone, pager, or wirelessly equipped portable computer, for instance. In a CDMA system the WCD may be referred to as an access terminal (AT) or a mobile station. In an LTE system the WCD may be referred to as user equipment (UE). When an AT or UE is positioned in a cell, it communicates via an RF air interface with the BTS or eNodeB antenna of the cell. Consequently, a communication path or "channel" is established between the AT or UE and the transport network, via the air interface, the BTS or eNodeB, the BSC or MME, and the switch or gateway.

As the demand for wireless communications has grown, the volume of call traffic in most cell sites has correspondingly increased. To help manage the call traffic, most cells in a wireless network are usually further divided geographically into a number of cell-sectors, each defined respectively by radiation patterns from directional antenna components of the respective BTS or eNodeB, or by respective antennas.

Functionally, a BTS of a cell or an eNodeB may be referred to as a "base station." The actual physical configuration of a base station can range from an integrated BTS-BSC or eNodeB unit to a distributed deployment of multiple BTSs under a single BSC, or multiple eNodeBs under a single MME. Regardless of whether it is configured to support one cell, multiple cells, or multiple sectors, a base station is typically deployed to provide coverage over a geographical area on a scale of a few to several square miles and for tens to hundreds to several thousands (or more) of subscribers at any one time.

In some areas, a wireless service provider may provide service via multiple wireless networks that operate according to different air interface protocols. For example, a first wireless network that operates according to a first air interface protocol (e.g., LTE) may be used for packet-based data communications, and a second wireless network that operates according to a second air interface protocol (e.g., CDMA) may be used for circuit-switched voice communications. A WCD may be able to operate under either of the first and second wireless networks, and may further be capable of handing off between them.

In some cases, a WCD may be handed off from a first wireless network to a second wireless network (or may otherwise transition from the first to the second wireless network) as part of a circuit-switched fallback (CSFB) process. The CSFB process may be performed, for example, to transition a WCD from a first wireless network (e.g., an LTE network) that is used for packet-data communications to a second wireless network (e.g., a CDMA network) that is used for circuit-switched communications so that the WCD can originate or receive a circuit-switched voice call.

Overview

A method and system is disclosed for controlling a circuit-switched fallback (CSFB) process. The CSFB process may be used to transition a wireless communication device (WCD) from a first wireless network (e.g., a wireless network that uses LTE) to a second wireless network (e.g., a wireless network that uses CDMA) in order to receive an incoming call (e.g., a voice call) via the second wireless network. The CSFB process may be controlled based on a load level of the second wireless network in a relevant area. For example, if the load level is threshold high, the CSFB process may be aborted. Otherwise, the CSFB process may proceed normally.

In one aspect, an example method is disclosed. A first wireless network receives from an interworking server an indication of an incoming call that a WCD can receive via a second wireless network. The WCD has a radio connection with a serving base station of the first wireless network. The first wireless network provides service under a first air interface protocol, and the second wireless network provides service under a second air interface protocol. The interworking server is configured to facilitate communications between the first wireless network and the second wireless network. The first wireless network sends to the interworking server an indication of a location related to the WCD. The interworking server determines a load level of the second wireless network in an area proximate the indicated location. The interworking server selects a control message from among at least a first control message and a second control message based on the load level. The interworking server sends the selected control message to the first wireless network. The first wireless network determines whether to transition the WCD to the second wireless network to receive the incoming call based on the selected control message.

In another aspect, an example system is disclosed. The example system comprises a first wireless network and an interworking server. The interworking server is configured to facilitate communications between the first wireless network and a second wireless network. The first wireless network comprises an antenna that radiates to define a coverage area, data storage that stores program instructions, and a processor capable of executing the program instructions to cause the first wireless network to perform operations relating to a WCD having a radio connection with the first wireless network. The operations include: (a) receiving from an interworking server an indication of an incoming call that the WCD can receive via the second wireless network; (b) sending to the interworking server an indication of a location related to the WCD; (c) receiving a selected control message from the interworking server; and (d) determining whether to transition the WCD to the second wireless network to receive the incoming call based on the selected control message from the interworking server.

These as well as other aspects, advantages, or alternatives will become apparent to those of ordinary skill in the art by reading the following detailed description, with reference where appropriate to the accompanying drawings. Further, it should be understood that the description provided by this overview section and elsewhere in this document is intended to explain and illustrate the invention by way of example only.

DETAILED DESCRIPTION

1. Introduction

Disclosed herein is a method and system for controlling a circuit-switched fallback (CSFB) process. The CSFB process may be used to transition a wireless communication device (WCD) from a first wireless network that uses a first air interface protocol, such as a Long-Term Evolution (LTE) protocol, to a second wireless network that uses a second air interface protocol, such as a Code Division Multiple Access (CDMA) protocol, for example, to enable the WCD to receive an incoming call via the second wireless network. The CSFB process can involve communications between the first wireless network and the second wireless network that are facilitated by an interworking server.

The CSFB process may result in the first wireless network transitioning the WCD to the second wireless network in one of two ways. In some cases, the transition may involve a handoff of the WCD from the first wireless network to the second wireless network. The first wireless network may request a handoff by sending to the second wireless network (via the interworking server) RF quality measurements of the second wireless network that have been obtained by the WCD. If the RF quality measurements are sufficient and air interface resources are available, then the second wireless network may assign a traffic channel for the WCD to use for the incoming call. The first wireless network may then send the WCD a handoff direction message that indicates the traffic channel to use for the incoming call. In response to the handoff direction message, the WCD releases its radio connection with the first wireless network and tunes to the traffic channel assigned by the second wireless network.

In other cases, the transition to the second wireless network may involve the first wireless network sending a release-and-redirect message to the WCD. The release-and-redirect message directs the WCD to release its radio connection with the first wireless network and to request a traffic channel for the incoming call from the second wireless network. To request a traffic channel from the second wireless network, the WCD may perform a CDMA acquisition process (e.g., scan for pilot signals, lock onto a sufficiently strong pilot signal, receive an associated sync channel, etc.) and then transmit a request in an access channel.

The inventors have recognized that these approaches for transitioning a WCD to the second wireless network to receive the incoming call can be unsuccessful if the second wireless network is heavily loaded in the area where the WCD is operating. For example, the second wireless network may be too heavily loaded to assign a traffic channel to the WCD for the incoming call. In such cases, a handoff of the WCD from the first wireless network to the second wireless network may be unavailable. In addition, the WCD's request for a traffic channel from the second wireless network (e.g., in response to a release-and-redirect message) may be unsuccessful.

To address this difficulty, the inventors propose methods and system for controlling the CSFB process based on the load level of the second wireless network in a relevant area (e.g., in an area where the WCD is operating). In this approach, once the CSFB process has been initiated (e.g., as requested by the WCD), the first wireless network may determine whether to proceed with the CSFB process and transition the WCD to the second wireless network to receive the incoming call (e.g., by sending a handoff direction message or a release-and-redirect message) based on a control message from the interworking server.

In example embodiments, the first wireless network sends to the interworking server an indication of a location related to the WCD (e.g., location coordinates of the WCD or an indication of the location of the base station serving the WCD), and the interworking server determines a load level of the second wireless network in an area proximate the indicated location. The interworking server selects a control message based on the determined load level and sends the selected control message to the first wireless network. If the load level is less than a predetermined threshold level, then the interworking server may select a first type of control message (e.g., a "proceed" message) that is configured to cause the first wireless network to proceed with the CSFB process, thereby transitioning the WCD to the second wireless network to receive the incoming call. If the load level is greater than the predetermined load level, then the interworking server may select a second type of control message (e.g., an "abort" message) that is configured to cause the first wireless network to abort the CSFB process, thereby maintaining the radio connection with the WCD instead of transitioning the WCD to the second wireless network. Other types of control messages are possible as well.

By controlling the CSFB process based on the load level of the second wireless network in a relevant area (e.g., in the area where the WCD is operating), the disclosed methods and systems can advantageously reduce the possibility of a scenario in which the WCD loses its radio connection with the first wireless network in order to receive an incoming call via the second wireless network but then is unable to obtain a traffic channel for the incoming call because the second wireless network is too heavily loaded. Beneficially, when the load level of the second wireless network is threshold high, the methods and systems disclosed herein can maintain the WCD's radio connection with the first wireless network instead of needlessly transitioning the WCD to the second wireless network. In such cases, the incoming call can be routed to a voice mail system that the WCD can access at a later time.

2. Example Communication System Architecture

Figure 1:
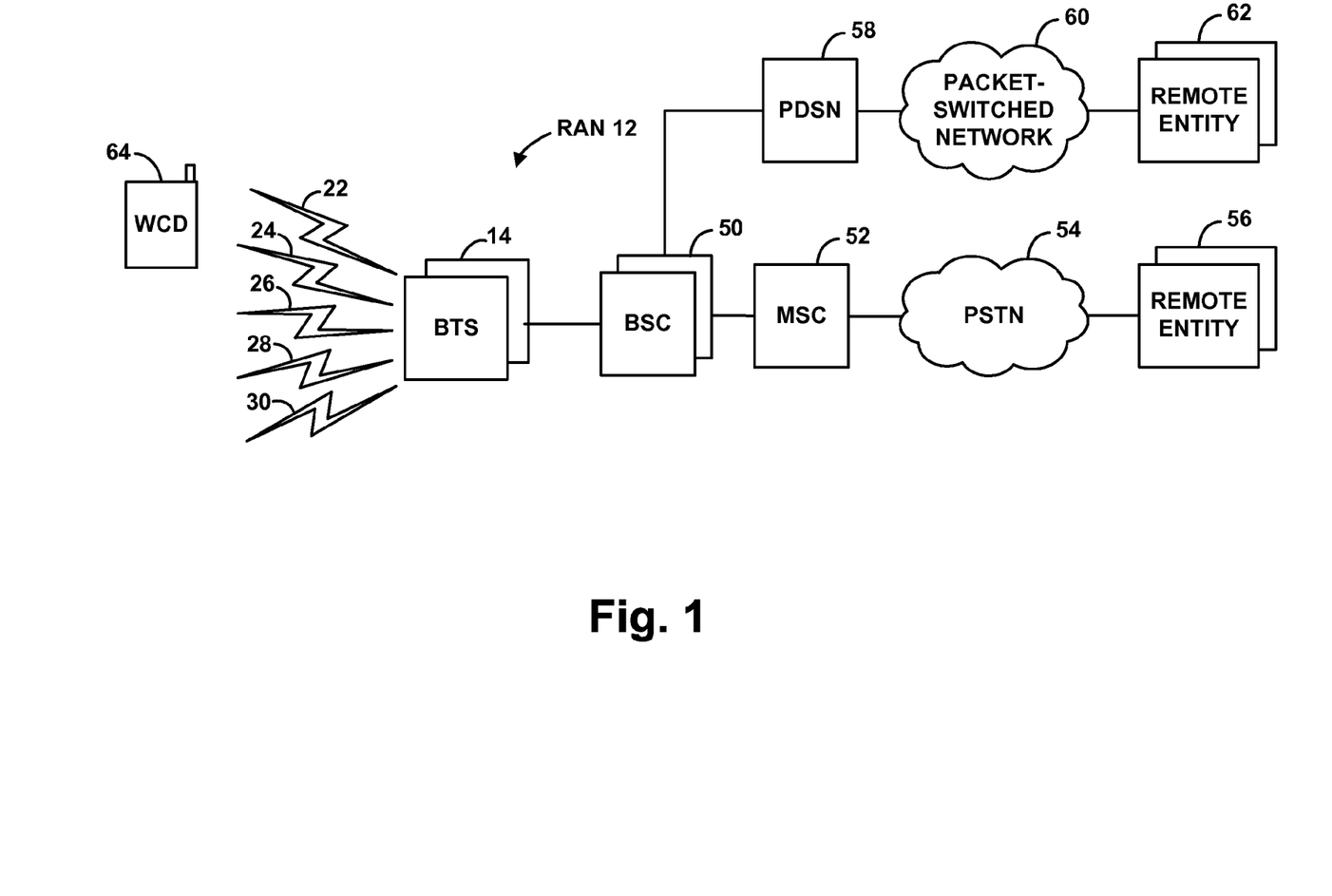
FIG. 1 is a simplified block diagram of a wireless communication system, according to an example embodiment.
Figure 2:
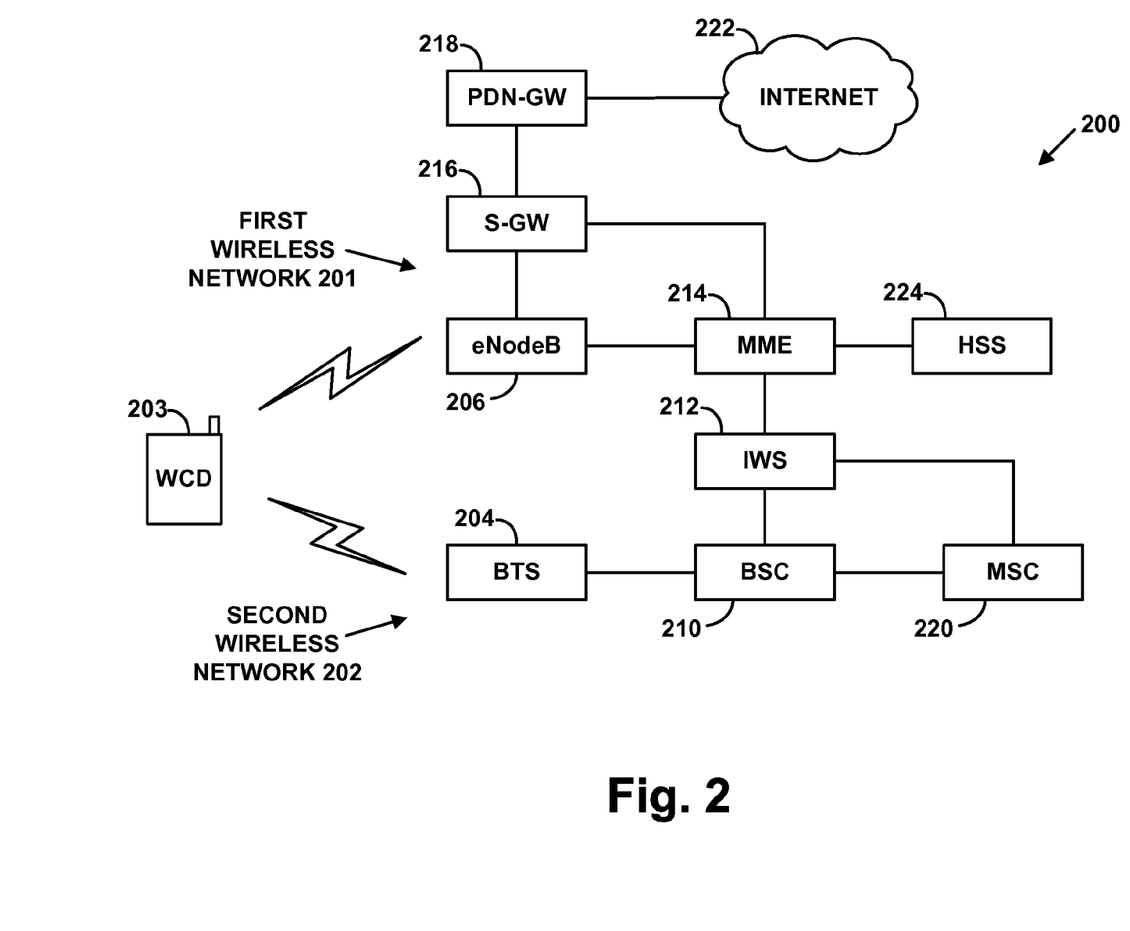
FIG. 2 is a simplified block diagram of a wireless communication system in which a service provider supports wireless service under two or more different air interface protocols, according to an example embodiment.

FIG. 1 and FIG. 2 are simplified block diagrams of example wireless communication systems in which example embodiments can be implemented. Service providers may implement networks in which service is provided under a CDMA standard (e.g., IS-95, IS-2000, 1×RTT, 1×EV-DO, etc.) as well as under a 4 G protocol such as LTE and/or WiMax. Service under both CDMA and LTE (or WiMAX) may be implemented in conjunction with the arrangement shown in FIG. 1, and more specific details of a network with overlapping CDMA and LTE will be discussed with reference to FIG. 2.

As shown in FIG. 1, an example wireless communication system may include a RAN 12 that radiates to define one or more coverage areas in which WCDs can engage in RF communication with the RAN 12. FIG. 1 depicts representative coverage areas 22-30 by way of example. The RAN 12 may define the one or more coverage areas 22-30 discretely through use of directional antennas and/or by various modulation parameters, including, without limitation, carrier frequencies, PN offsets, and/or other parameters, depending on the air interface protocol used. Example air interface protocols include CDMA (e.g., IS-95, IS-2000, 1×RTT, 1×EV-DO, etc.), iDEN, WiMAX, TDMA, AMPS, GSM, GPRS, UMTS, EDGE, LTE, WI-FI (e.g., 802.11), BLUETOOTH, and others now known or later developed. In practice, the coverage areas 22-30 may overlap to some extent, so that a served WCD can move seamlessly from one coverage area to another.

As shown, the RAN 12 may include one or more base stations 14 (also referred to as "base transceiver stations" (BTSs)), and one or more base station controllers (BSCs) 50 (which may be integrated with or separate entities from the one or more of the base stations). The base stations 14 may include directional antennas, power amplifiers, and associated transceiver equipment arranged to establish corresponding wireless coverage areas and to communicate with WCDs in those coverage areas 22-30.

The coverage areas 22-30 served by the one or more base stations 14 may be cells, cell-sectors, or some other defined wireless coverage area. Each base station 14 may serve a single coverage area (e.g., a single cell or cell-sector), or may serve multiple discrete coverage areas, such as multiple sectors, for instance.

Each BSC 50 may be coupled with one or more switches, such as a mobile switching center (MSC) 52, which provides connectivity with the public-switched telephone network (PSTN) 54, so that served WCDs can communicate with remote entities 56 on the PTSN. Additionally or alternatively, each BSC may be coupled with one or more gateways, such as packet data serving node (PDSN) 58, which provides connectivity with a packet-switched network 60, so that served WCDs can communicate with remote entities 62 on the packet-switched network.

Note that the combination of BTS 14 and BSC 50 may be considered a base station. However, BTS 14 or BSC 50 could, taken alone, be considered a base station as well. Additionally, a base station may be considered to be either or both of those devices, and perhaps make use of one or more functions provided by an MSC, a PDSN, and/or any other entity.

FIG. 1 depicts a representative WCD 64 by way of example. This WCD 64 could be a cell phone, tablet, laptop computer, wirelessly equipped personal digital assistant (PDA), personal computer, home electronic device, or any other type of wirelessly-equipped device now known or later developed. WCD 64 may be equipped with hardware, software, and/or other logic to communicate with RAN 12 in accordance with an agreed communication protocol, such as one of the protocols noted herein for instance. For example, in an exemplary embodiment, a WCD includes a wireless communication interface that functions to facilitate air interface communication with RAN 12 according to LTE and/or CDMA.

Further, WCD 64 may include a user interface, which typically includes components for receiving input from a user of WCD 64 and providing output to a user of the WCD 64. Yet further, WCD 64 may include program logic stored in data storage (e.g., one or more volatile and/or non-volatile storage components of the WCD, such as magnetic, optical, or organic storage components) and executable by one or more processors (e.g., general purpose and/or special purpose processors) to carry out various functions described herein.

FIG. 2 illustrates an example wireless communication system 200 in which a service provider supports wireless service under two different air interface protocols: LTE and CDMA. In particular, wireless communication system 200 includes a first wireless network 201 that uses LTE and a second wireless network 202 that uses CDMA. In this example, the coverage areas of first wireless network 201 and second wireless network 202 at least partially overlap. Thus, in the areas of overlapping coverage areas, WCDs may be able to engage in wireless communication with either the first wireless network 201 or the second wireless network 202 (or both). As shown, WCD 203 is able to wirelessly communicate with either of the wireless networks. For example, WCD 203 may initially have a radio connection with first wireless network 201 and may then transition to the second wireless network 202, for example, to receive an incoming call.

In the illustrated configuration, second wireless network 202 includes components to provide for CDMA communications with WCDs, such as WCD 203. Specifically, FIG. 2 shows a BTS 204, a BSC 210, and an MSC 220, which collectively (and possibly in conjunction with other components that help to provide service under CDMA) function as a CDMA network. Note that BTS 204, BSC 210, and MSC 220 may be configured for the same or similar functions as BTS 14, BSC 50, and MSC 52, which were described in reference to FIG. 1. Although FIG. 2 shows one BSC and one BTS, it is to be understood that MSC 220 could be connected to multiple BSCs, and each BSC (including BSC 210) could be connected to multiple BTSs. Each BTS may provide CDMA wireless service in one or more coverage areas, such as a cell or one or more cell-sectors.

First wireless network 201 includes components to provide for LTE communications with WCDs, such as WCD 203. Specifically, first wireless network 201 includes an eNodeB 206 that can wireless communicate with one or more WCDs, such as WCD 203, via respective radio connections. Although FIG. 2 shows only one eNodeB, it is to be understood that first wireless network 201 could include multiple eNodeBs. Each eNodeB may provide LTE wireless service in one or more coverage areas, such as a cell or one or more cell-sectors.

To support LTE communications, first wireless network 201 also includes a mobility management entity (MME) 214, which may be configured to control communications between one or more eNodeBs and a serving gateway (S-GW) 216. MME 214 may also be communicatively coupled to a home subscriber server (HSS) 224, which stores subscriber information, such as information related to WCD 203. More generally, an MME 214 may support functionality such as mobility management, bearer management, paging-message distribution, security functions, authentication of WCDs, gateway selection for communications, and so on.

In an exemplary configuration, S-GW 216 may be configured to communicate with one or more eNodeBs and/or with MME 214 in order to provide various functions such as packet routing and forwarding, mobility anchoring, packet buffering, and so on. For instance, S-GW 216 may provide packet routing for LTE communications to and/or from WCD 203. In addition, first wireless network 201 may include a packet data network gateway (PDN-GW) 218, which facilitates packet-data communications between an S-GW 216 that operates according to LTE, and a packet-data network, such as the Internet 222.

Wireless communication system 200 also includes an interworking server (IWS) 212 that facilitates communications between the first wireless network 201 and the second wireless network 202. IWS 212 may be connected to MSC 220 via an A1 interface and may be connected to MME 214 via an S102 interface.

In an example embodiment, IWS 212 is configured to communicate with first wireless network 201 and second wireless network 202 to implement CSFB functionality. In the CSFB process, a WCD that is being served by the first wireless network 201 is transitioned to the second wireless network 202 (the "fall back" network), such as by a handoff direction message or a release-and-redirect message, to allow the WCD to originate or receive a circuit-switched voice call. During the CSFB process, the IWS 212 may tunnel signaling communications between the first wireless network 201 and the second wireless network 202.

In an example embodiment, WCD 203 may register with the first wireless network 201 and may also register with the second wireless network 202 via the first wireless network 201. More specifically, when the WCD 203 connects to eNodeB 206 in the first wireless network 201, the WCD 203 can communicate with MSC 220 through the IWS 212. The IWS 212 functions to bridge the first wireless network 201 and the second network 202 by encapsulating and relaying CDMA messages between the WCD 203 and the MSC 220. For example, WCD 203 may send CDMA messages via eNodeB 206 and MME 214 to IWF 212. The IWF 212 may then encapsulate and relay such CDMA messages to MSC 220. Similarly, the IWF 212 may encapsulate and relay CDMA messages from MSC 220 to MME 214 for delivery to the WCD 203 via eNodeB 206.

As a result of WCD 203 being registered with both the first wireless network 201 and the second wireless network 202, a request to connect an incoming circuit-switched voice call to WCD 203 may be routed to MSC 220. MSC 220 may then send to IWS 212 a page message that is configured to notify WCD 203 of the incoming call under the CDMA protocol. The IWS 212 may encapsulate the CDMA page message in an LTE signaling message and send the encapsulated CDMA page message to MME 214. In turn, MME 214 sends the CDMA encapsulated page message to eNodeB 206 for delivery to the WCD 203 using the LTE air interface protocol. The CDMA page message that the WCD 203 receives in this way may notify WCD 203 of the incoming call and may further notify WCD 203 that the incoming call is a circuit-switched voice call that the WCD 203 can receive via the second wireless network. In response to the CDMA page message, the WCD 203 may send to the eNodeB 206 an Extended Service Request (ESR) message that requests CSFB for the call. In response, the first wireless network 201 may transition the WCD 203 to the second wireless network 202 to receive the incoming call. However, as disclosed herein, the first wireless network 201 may determine whether to transition the WCD 203 to the second wireless network 202 to receive the incoming call based on a control message from the IWS 212.

It should be understood that the network arrangements shown in FIGS. 1 and 2 and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or other non-transitory computer readable medium.

3. Example Network Component

Figure 3:
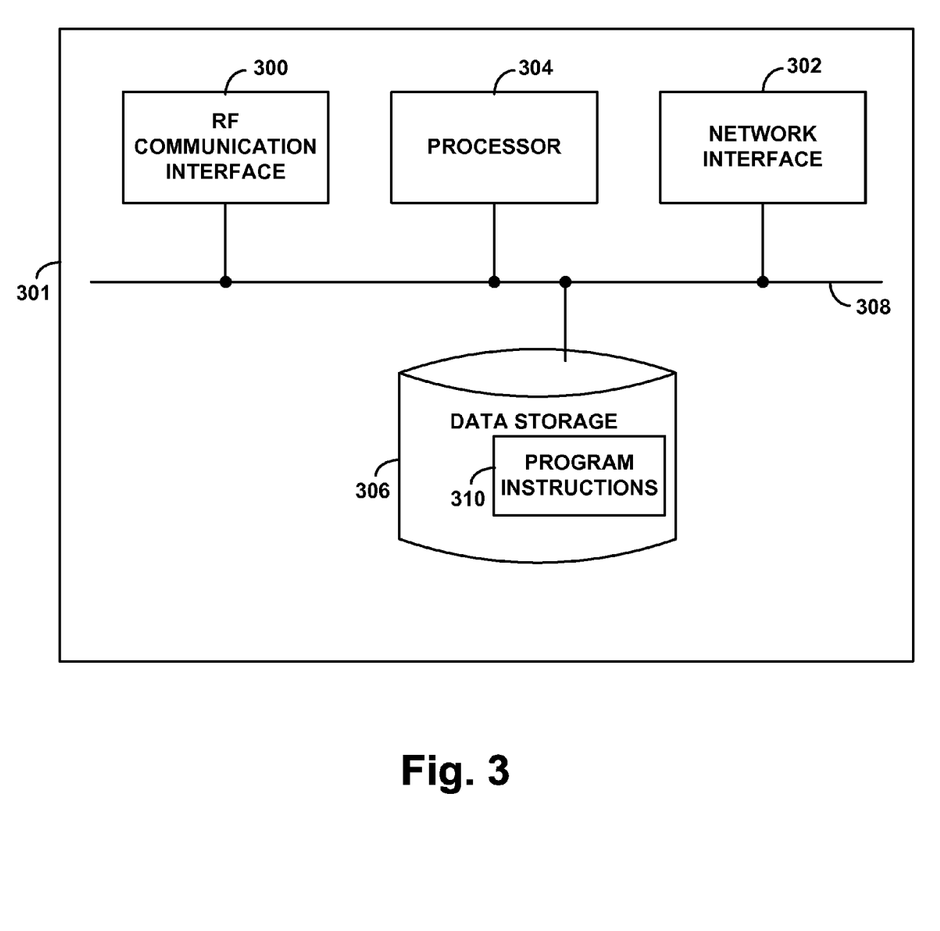
FIG. 3 is a simplified block diagram of a network component, according to an example embodiment.

FIG. 3 is a simplified block diagram illustrating an example network component 301 arranged to operate in accordance with the embodiments disclosed herein. Network component 301 could correspond to any component of the first wireless network 201 or second wireless network 202. Thus, network component 301 could correspond to a base station (e.g., BTS 204 or eNodeB 206), to a control element (e.g., MME 214, BSC 210, or MSC 220), or to a combination of such elements. For example, network component 301 could correspond to eNodeB 206 or to eNodeB 206 in combination with MME 214. Alternatively, network component 301 could correspond to a different type of network element or combination of network elements.

As shown, network component 301 includes an RF communication interface 300, a network interface 302, a processor 304, and data storage 306, all of which may be communicatively linked together by a system bus, network, or other connection mechanism 308. The connection mechanism 308 may include connections between network elements, such as a connection between eNodeB 206 and MME 214.

RF communication interface 300 may comprise one or more antenna structures, one or more power amplifiers, and associated equipment, for engaging in RF communication with WCDs, according to LTE, CDMA, or other air interface protocol. One or more antennas in RF communication interface 300 may radiate to define one or more coverage areas, such as a cell or a plurality of cell-sectors. Such cell-sectors may be provided by directional antennas in RF communication interface 300.

Network interface 302 may comprise any sort of communication link or mechanism enabling the network component 301 to exchange signaling and/or bearer communications with another network element.

Processor 304 may comprise one or more processors (e.g., general purpose and/or special purpose processors), such as microprocessors. Data storage 306 may be any type of non-transitory computer readable medium. For example, data storage 306 may include one or more volatile and/or non-volatile memories. Alternatively or additionally, data storage 306 may include magnetic, optical, or organic data storage components. Data storage 306 may be integrated in whole or in part with processor 304. As further shown, data storage 306 stores program instructions 310 that are executable by processor 304 to cause network component 301 to carry out any of the operations described herein, such as any of the operations of the first wireless network described below in connection with FIG. 4 and FIG. 5.

In an exemplary embodiment, data storage 306 may include program instructions that are executable to cause a first wireless network (e.g., first wireless network 201) or a component thereof to perform operations comprising: (a) receiving from an interworking server (e.g., IWS 212) an indication of an incoming call that the WCD (e.g., WCD 203) can receive via a second wireless network (e.g., second wireless network 202); (b) sending to the interworking server an indication of a location related to the WCD; (c) receiving a selected control message from the interworking server; and (d) determining whether to transition the WCD to the second wireless network to receive the incoming call based on the selected control message from the interworking server.

4. Example Operation

Figure 4:
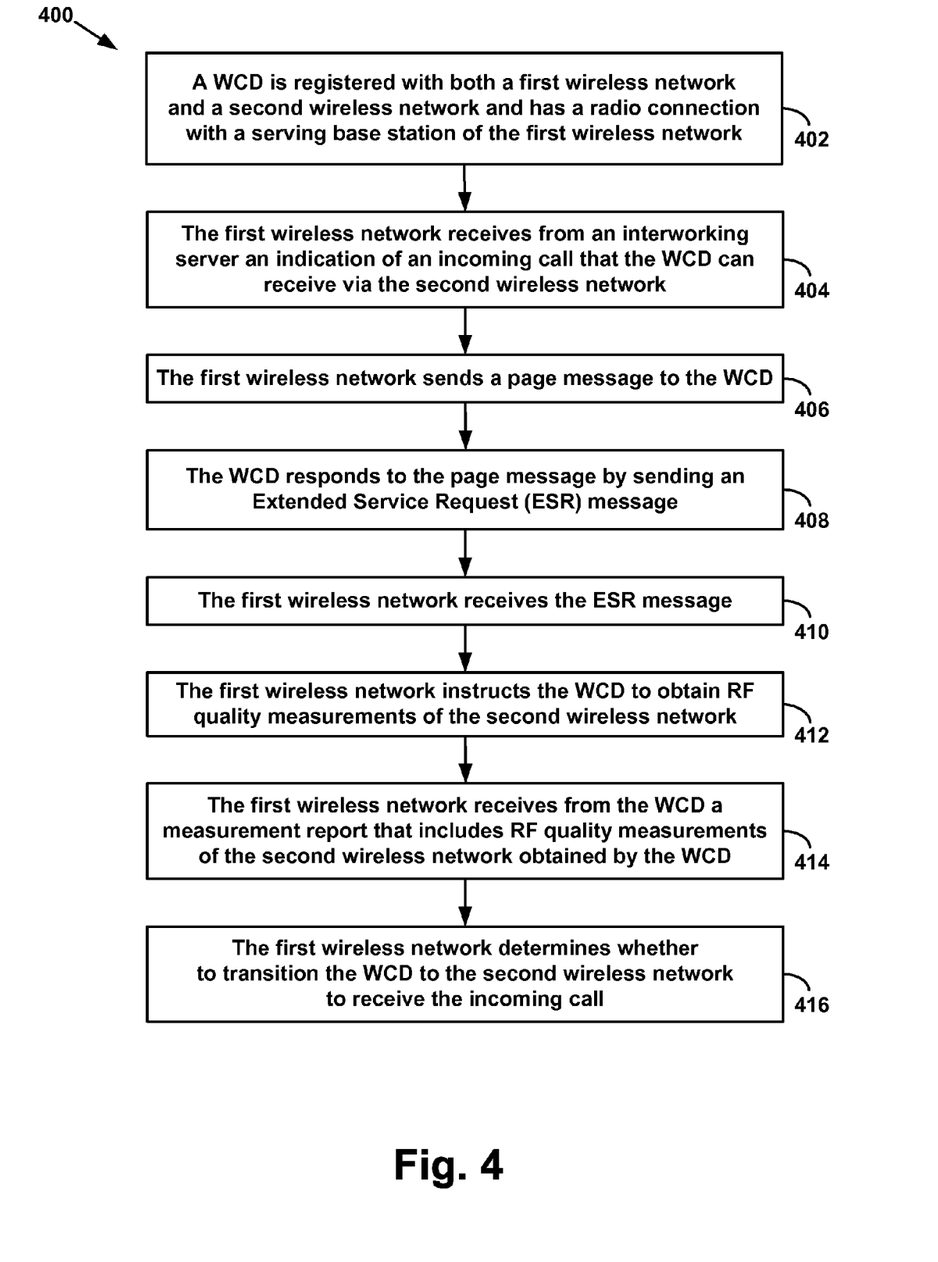
FIG. 4 is a flow chart illustrating a method of initiating and controlling a CSFB process, according to an example embodiment.
Figure 5:
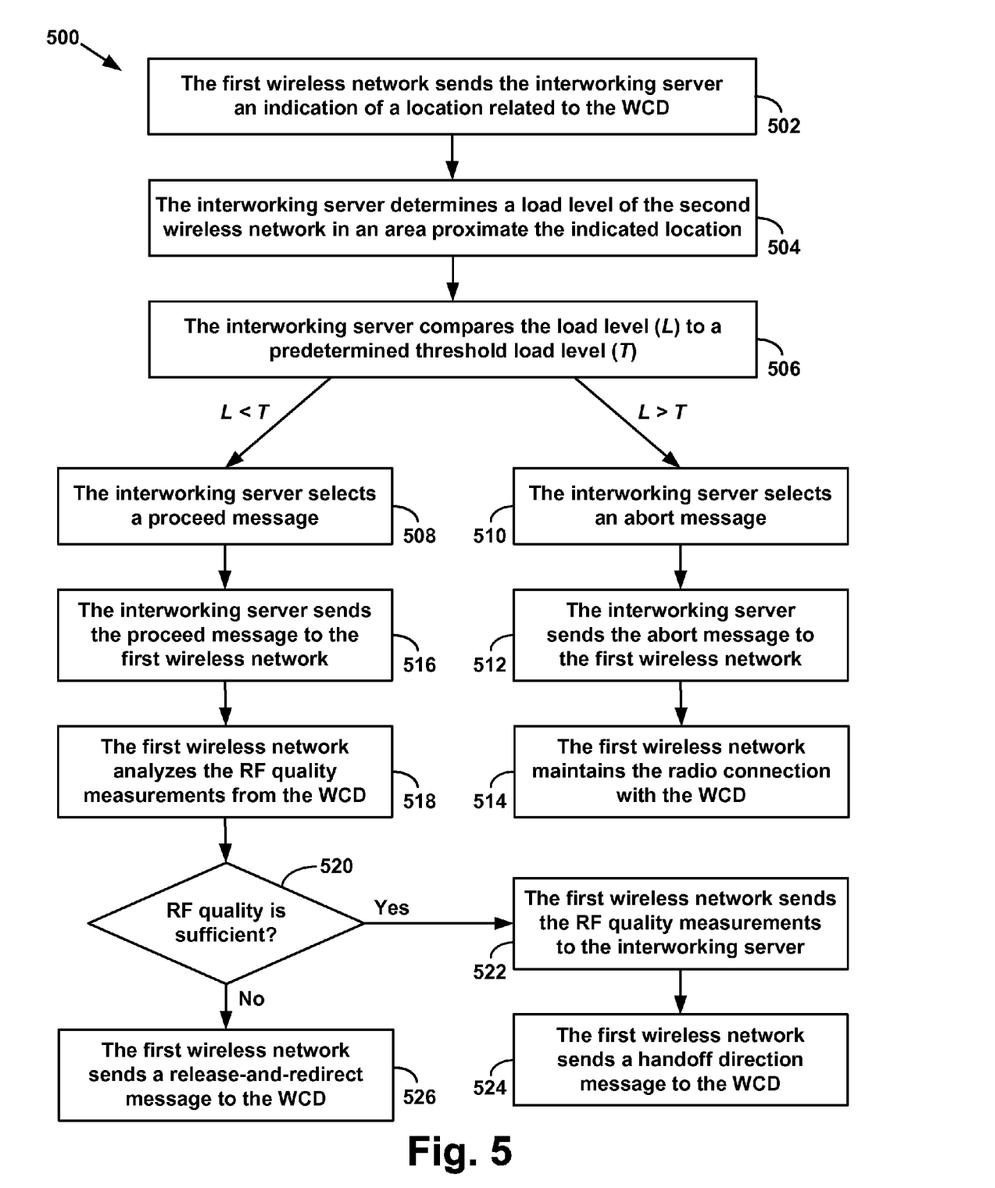
FIG. 5 is a flow chart illustrating a method of selecting a control message based on a load level and controlling a CSFB process based on the selected control message, according to an example embodiment.

FIGS. 4 and 5 are flow charts that illustrate example methods. FIG. 4 illustrates a method 400 that includes a CSFB process being initiated in response to an indication of an incoming call that a WCD can receive via a second wireless network and in which the first wireless network determines whether to proceed with the CSFB process (i.e., whether to transition the WCD to the second wireless network to receive the incoming call). FIG. 5 illustrates a method 500 in which the first wireless network determines whether to proceed with the CSFB process based on a control message from an interworking server (i.e., whether the interworking server sends a "proceed" message or an "abort" message to the first wireless network). For purposes of illustration, FIGS. 4 and 5 will be described with reference to the example wireless communication system 200 illustrated in FIG. 2, in which the first wireless network 201 is configured for air interface communications using LTE and the second wireless network 202 is configured for air interface communications using CDMA. It is to be understood, however, that other types of wireless networks and/or other air interface protocols could be used in the methods illustrated in FIGS. 4 and 5.

As shown in FIG. 4, method 400 begins in a state in which a WCD (e.g., WCD 203) is registered with both a first wireless network (e.g., first wireless network 201) and a second wireless network (e.g., second wireless network 202) and has a radio connection with a serving base station (e.g., eNodeB 206) of the first wireless network, as indicated by block 402. In this state, the first wireless network receives from an interworking server (e.g., IWS 212) an indication of an incoming call that the WCD can receive via the second wireless network, as indicated by block 404. The incoming call may be a circuit-switched voice call routed to the second wireless network based on the WCD being registered with the second wireless network. For instance, in response to a request to connect an incoming call to WCD 203, MSC 220 in the second wireless network 202 may send to IWS 212 a request to page WCD 203 and IWS 212 may send an encapsulated page message to MME 214 in the first wireless network 201.

The first wireless network then sends a page message to the WCD, as indicated by block 406. The page message may be transmitted by the WCD's serving base station using LTE. The page message may be based on an encapsulated page message sent by the interworking server. The page message may identify the incoming call. For example, the page message may identify the originator of the call and may identify the WCD as an intended recipient of the call. The page message may further identify the incoming call as a circuit-switched voice call that the WCD can receive via the second wireless network.

The WCD responds to the page message by sending an Extended Service Request (ESR) message, as indicated by the 408. The ESR message may request initiation of a CSFB process to transition the WCD to the second wireless network to receive the incoming call.

The first wireless network receives the ESR message, as indicated by 410. After receiving the ESR message from the WCD, the first wireless network instructs the WCD to obtain RF quality measurements of the second wireless network, as indicated by block 412. The first wireless network then receives from the WCD a measurement report that includes RF quality measurements of the second wireless network obtained by the WCD, as indicated by block 414. The RF quality measurements may correspond to one or more coverage areas, such as cells or cell-sectors, of the second wireless network. For example, with reference to FIG. 2, the RF quality measurements may be for one or more coverages areas of BTS 204 and/or one or more coverage areas of other BTSs in second wireless network 202.

The RF quality measurements may include any suitable indication of RF signal quality. The RF quality measurements could be, for example, $E_C/I_0$ values measured by the WCD. The $E_C/I_0$ value is a ratio of the power level at which the WCD receives the forward link pilot channel ("Er" for "energy per chip") to the power level at which the WCD receives all transmissions ("$I_0$") in the received bandwidth. It should be understood, however, that the WCD could measure signal strengths of the second wireless network in terms of parameters other than $E_C$ and $I_0$. For example, the RF quality measurements could be signal-to-noise ratios measured by the WCD. Other types of RF quality measurements are possible as well.

Method 400 concludes with the first wireless network determining whether to transition the WCD to the second wireless network to receive the incoming call, as indicated by block 416. The first wireless network may make this determination based, at least in part, on a control message that the first wireless network receives from the interworking server. For example, the determination could be based on whether the interworking server sends a "proceed" message or an "abort" message (e.g., as discussed below for FIG. 5).

If the first wireless network determines to transition the WCD to the second wireless network, then the first wireless network proceeds with the CSFB process. The result of the CSFB process could be that the first wireless network sends either a handoff direction message or a release-and-direct message to the WCD, as discussed below.

If the first wireless network determines not to transition the WCD to the second wireless network, then the CSFB process is aborted and the first wireless network maintains the radio connection with the WCD. As a result, the incoming call is not received by the WCD. The incoming call could instead be routed to a voice mail system associated with the WCD.

Although FIG. 4 shows block 416 as occurring after blocks 412 and 414, it is possible that block 416 could occur before blocks 412 and 414 or in parallel with blocks 412 and 414. For example, the first wireless network may first determine whether to transition the WCD to the second wireless network (block 416) and then instruct the WCD to obtain RF quality measurements of the second wireless network (block 412) only in the case that the first wireless network determines that the WCD should be transitioned to the second wireless network. Alternatively, the first wireless network may instruct the WCD to obtain RF quality measurements of the second wireless network (block 412) while the first wireless network is in the process of determining whether to transition the WCD to the second wireless network (block 416), e.g., while the first wireless network is waiting to receive a control message from the interworking server.

FIG. 5 illustrates a method 500 in which the first wireless network determines whether to transition the WCD to the second wireless network based on a control message from the interworking server. Thus, method 500 may correspond to block 416 of method 400, and an overall method of controlling a CSFB process could involve both method 400 and method 500 being performed.

Method 500 begins with the first wireless network sending the interworking server an indication of a location related to the WCD, as indicated by block 502. The first wireless network may send this indication of location in response to an action occurring in method 400, such as the first wireless network receiving the ESR message from the WCD (block 410) or the first wireless receiving the measurement report from the WCD (block 414). Other triggers for causing the first wireless network to send the interworking server an indication of a location related to the WCD are possible as well.

The location indicated by the first wireless network in block 502 could be, for example, in the form of latitude and longitude coordinates of the WCD. The coordinates could be obtained by the WCD using the Global Position System (GPS) or using a terrestrial-based positioning system. In one example, the first wireless network requests that the WCD provide its location (e.g., in connection with the page message of block 406) and the WCD responds with its GPS coordinates (e.g., in the ESR message of block 408). Alternatively, the indication of a location related to the WCD could be an indication of the location of the serving base station, such as latitude/longitude coordinates of the serving base station or an identifier of the serving base station. Other ways of indicating a location related to the WCD are possible as well.

The interworking server than determines a load level (L) of the second wireless network in an area proximate the indicated location, as indicated by block 504. To make this determination, the interworking server may select one or more relevant coverage areas (cells or cell-sectors) of the wireless network based on the indicated location. For example, the interworking server may select the relevant coverage areas as the cell-sector that encompasses the indicated location and a certain number of cell-sectors surrounding that cell-sector. For each of the relevant coverage areas, the interworking server may determine a respective load level and then calculate L as the average of the load levels of the relevant coverage areas.

The interworking server may determine the load levels of the relevant coverage areas by querying one or more BTSs that radiate to define the relevant coverage areas, or by querying a BSC, an MSC, or other elements of the second wireless network. The load level of a coverage area could be determined based on traffic channel usage in that coverage area. For example, a coverage area's load level could be given as a percentage of the coverage area's traffic channels being used. Other ways of characterizing a coverage area's load level are possible as well.

The interworking server then compares the load level (L) to a predetermined threshold load level (T), as indicated by block 506. The type of control message that the interworking server selects and sends to the first wireless network to control the CSFB process may depend on whether L is less than or greater than T. If L is less than T, then the interworking server selects a proceed message, as indicated by block 508. The proceed message is configured to cause the first wireless network to proceed with the CSFB process. If L is greater than T, then the interworking server selects an abort message, as indicated by block 510. The abort message is configured to cause the first wireless network to abort the CSFB process.

The interworking server may also select the abort message instead of the proceed message based on other factors indicating that transitioning the WCD to the second wireless network to receive the incoming call may be undesirable. For example, when the interworking server receives the indicated location related to the WCD (block 502), the interworking server may start a timer for completion of the process of determining L and comparing L to T (blocks 504 and 506). If the timer runs out before this process is completed, then the interworking server may select the abort message instead of the proceed message. Thus, if the process of determining the load level of the second wireless network takes too long, this may indicate a problem with the second wireless network such that transitioning the WCD to the second wireless network may be undesirable.

In the case that the interworking server selects an abort message (block 510), the interworking server sends the abort message to the first wireless network (e.g., to MME 214), as indicated by block 512. The interworking server may also send a message to the second wireless network (e.g., to MSC 220) to indicate that the incoming call cannot be connected to the WCD. As a result, the incoming call may be redirected to a voice mail system.

In response to the abort message, the first wireless network maintains the radio connection with the WCD instead of transitioning the WCD to the second wireless network, as indicated by block 514. The first wireless network may also send the WCD an indication that the requested CSFB will not proceed and/or an indication that the incoming call is being sent to voice mail.

In the case that the interworking server selects a proceed message (block 508), the interworking server sends the proceed message to the first wireless network (e.g., to MME 214), as indicated by block 516. In response to receiving the proceed message from the interworking server, the first wireless network proceeds with the CSFB process. As indicated by block 518, this may involve the first wireless network analyzing the RF quality measurements that were obtained by the WCD and sent to the first wireless network in the WCD's measurement report (block 414).

The first wireless network may analyze the RF quality measurements to determine whether the RF quality of the second wireless network is likely to be sufficient for a successful handoff of the WCD to the second wireless network, as indicated by block 520. To make this sufficiency determination, the first wireless network may compare the RF quality measurements to an RF quality threshold. If any of the RF quality measurements is greater than the RF quality threshold, then the first wireless network may determine that the RF quality is sufficient. Otherwise, the first wireless network may determine that the RF quality is insufficient. The RF quality threshold could be, for example, a particular $E_c/I_0$ value. The RF quality threshold could be the same for all coverage areas of the second wireless network. Alternatively, the RF quality threshold could be different for different coverage areas and/or could be dependent on other factors such as time of day. For example, the RF quality threshold for a coverage area of the second wireless network could be based on handoff statistics for handoffs from the first wireless network to that coverage area of the second wireless network. Other ways of determining whether the RF quality is sufficient are possible as well.

If the RF quality is sufficient, then the first wireless network sends the RF quality measurements to the interworking server, as indicated by block 522. The interworking server may then send the RF quality measurements to the second wireless network (e.g., to MSC 220) to request a handoff of the WCD to the second wireless network. If the request is successful, then the second wireless network may send a handoff direction message to the interworking server. The handoff direction message may specify an air interface traffic channel of a coverage area of the second wireless network that the WCD is to use to receive the incoming call. The interworking server may encapsulate the handoff direction message in an LTE message and send the encapsulated handoff direction message to the first wireless network for delivery to the WCD. Thus, the first wireless network may send the handoff direction message to the WCD, as indicated by block 524. In response, the WCD releases its radio connection with the first wireless network and tunes to the traffic channel of the second wireless network indicated in the handoff direction message to receive the incoming call. In this way, the first wireless network may transition the WCD to the second wireless network to receive the incoming call.

If the request is unsuccessful, then the second wireless network may send a failure message to the interworking server, and the interworking server may indicate the failure message to the first wireless network. In response, the first wireless network may send a release-and-redirect message to the WCD. The release-and-redirect message causes the WCD to release its radio connection with the first wireless network and communicate directly with the second wireless network to obtain a traffic channel for the incoming call. Thus, the WCD may perform a CDMA acquisition process (e.g., scan for pilot signals, lock onto a sufficiently strong pilot signal, receive an associated sync channel, etc.) and then transmit a request in an access channel to request a traffic channel for the incoming call. The release-and-redirect message, like the handoff direction message, transitions the WCD to the second wireless network to receive the incoming call.

It is to be understood that the second wireless network may determine success or failure for the requested handoff based on whether two criteria are satisfied: (1) the RF quality measurements indicate that RF quality is sufficient to support a handoff of the WCD to a coverage area of the second wireless network; and (2) at least one coverage area for which the RF quality is sufficient also has a load level that is low enough to allow a traffic channel to be assigned to the WCD for the incoming call. The first wireless network's analysis of the RF quality measurements for sufficiency (blocks 518 and 520) can beneficially result in criterion (1) being satisfied. Further, the interworking's server calculation of L, the load level in the relevant area of the second wireless network, and determination that L is less than T, the predetermined threshold load level (blocks 504 and 506), can beneficially result in criterion (2) being satisfied. Thus, the first wireless network sending the RF quality measurements to the interworking server (block 522) and the interworking server subsequently sending the RF quality measurements to the second wireless network is likely to result in the first wireless network being able to send the WCD a handoff direction message instead of a release-and-redirect message.

Returning to block 520, if the first wireless network determines that the RF quality is insufficient, then the first wireless network may refrain from sending the RF quality measurements to the interworking server. Instead, the first wireless network may send a release-and-redirect message to the WCD, as indicated by block 526. The release-and-redirect message causes the WCD to release its radio connection with the first wireless network and communicate directly with the second wireless network to obtain a traffic channel for the incoming call. Thus, the WCD may perform a CDMA acquisition process (e.g., scan for pilot signals, lock onto a sufficiently strong pilot signal, receive an associated sync channel, etc.) and then transmit a request in an access channel to request a traffic channel for the incoming call.

In this way, the control message from the interworking server can beneficially control the CSFB process based on the load level of the second wireless network in a relevant area. If the load level is threshold high, the interworking server may send a control message that causes the first wireless network to abort the CSFB process and maintain the radio connection with the WCD. Advantageously, a possibly futile transition of the WCD to the second wireless network (futile because the second wireless network is too heavily loaded to be able to assign a traffic channel for the incoming call) can be avoided. If the load level is not threshold high, the interworking server may send a control message that causes the first wireless network to proceed with the CSFB process. Thus, the first wireless network may transition the WCD to the second wireless network to receive the incoming call by sending either a handoff direction message or a release-and-redirect message.

5. Conclusion

An exemplary embodiment of the present invention has been described above. Those of ordinary skill in the art will appreciate, however, that numerous changes may be made from the embodiment described without deviating from the scope of the invention as defined by the claims.

We claim:

1. A method comprising:
   a first wireless network receiving from an interworking server an indication of an incoming call that a wireless communication device (WCD) can receive via a second wireless network, wherein the WCD has a radio connection with a serving base station of the first wireless network, wherein the first wireless network provides service under a first air interface protocol and the second wireless network provides service under a second air interface protocol, and wherein the interworking server is configured to facilitate communications between the first wireless network and the second wireless network;
   the first wireless network sending to the interworking server an indication of a location related to the WCD;
   the interworking server determining a load level of the second wireless network in an area proximate the indicated location;
   the interworking server selecting a control message from among at least a first control message and a second control message based on the load level;
   the interworking server sending the selected control message to the first wireless network; and
   the first wireless network determining whether to transition the WCD to the second wireless network to receive the incoming call based on the selected control message.

2. The method of claim 1, wherein the interworking server selecting a control message from among at least a first control message and a second control message based on the load level comprises:
   if the load level is less than a threshold level, selecting the first control message as the selected control message; and
   if the load level is greater than the threshold level, selecting the second control message as the selected control message.

3. The method of claim 2, wherein the first wireless network determining whether to transition the WCD to the second wireless network to receive the incoming call based on the selected control message comprises:
  if the selected control message is the first control message, the first wireless network transitioning the WCD to the second wireless network; and
  if the selected control message is the second control message, the first wireless network maintaining the radio connection with the WCD instead of transitioning the WCD to the second wireless network.

4. The method of claim 3, further comprising:
  the interworking server starting a timer in response to receiving the indication of the location related to the WCD; and
  if the timer runs out before the interworking server determines the load level, the interworking server selecting the second control message as the selected control message.

5. The method of claim 3, wherein the first wireless network transitioning the WCD to the second wireless network comprises:
  the first wireless network sending a handoff direction message or a release-and-redirect message to the WCD, wherein the handoff direction message instructs the WCD to use a specific traffic channel of the second wireless network for the incoming call, wherein the release-and-redirect message instructs the WCD to release the radio connection with the first wireless network and request a traffic channel for the incoming call from the second wireless network.

6. The method of claim 5, wherein the first wireless network transitioning the WCD to the second wireless network comprises:
  the first wireless network analyzing RF quality measurements of the second wireless network obtained by the WCD to determine whether the RF quality of the second wireless network is sufficient;
  in response to a determination that the RF quality of the second wireless network is sufficient, the first wireless network sending the RF quality measurements to the interworking server; and
  in response to a determination that the RF quality of the second wireless network is not sufficient, the first wireless network sending the release-and-redirect message to the WCD.

7. The method of claim 1, wherein the interworking server determining a load level of the second wireless network in an area proximate the indicated location comprises:
  the interworking server determining respective load levels of one or more coverage areas of the second wireless network, wherein the one or more coverage areas encompass the indicated location.

8. The method of claim 7, wherein the interworking server determining respective load levels of one or more coverage areas of the second wireless network comprises:
  the interworking server determining traffic channel usage in the one or more coverage areas.

9. The method of claim 1, wherein the first wireless network sending to the interworking server an indication of a location related to the WCD comprises:
  the first wireless network sending to the interworking server a Global Position System (GPS) location of the WCD.

10. The method of claim 1, wherein the first wireless network sending to the interworking server an indication of a location related to the WCD comprises:
  the first wireless network sending to the interworking server an identifier of the serving base station of the first wireless network.

11. The method of claim 1, further comprising:
  the first wireless network sending a page message to the WCD, wherein the page message indicates the incoming call; and
  the first wireless network receiving from the WCD a response to the page message, wherein the response comprises a request to receive the incoming call via the second wireless network.

12. The method of claim 11, wherein the request to receive the incoming call via the second wireless network comprises an Extended Service Request (ESR) message.

13. The method of claim 11, further comprising:
  after receiving the response to the page message, the first wireless network instructing the WCD to obtain radio frequency (RF) quality measurements of the second wireless network.

14. The method of claim 13, further comprising:
  the first wireless network receiving a measurement report from the WCD, wherein the measurement report includes RF quality measurements of the second wireless network obtained by the WCD.

15. The method of claim 14, wherein the first wireless network sending to the interworking server an indication of a location related to the WCD occurs in response to the first wireless network receiving the request to receive the incoming call via the second wireless network.

16. The method of claim 14, wherein the first wireless network sending to the interworking server an indication of a location related to the WCD occurs in response to the first wireless network receiving the measurement report.

17. A system comprising:
  a first wireless network; and
  an interworking server configured to facilitate communications between the first wireless network and a second wireless network,
  wherein the first wireless network comprises:
    an antenna that radiates to define a coverage area;
    data storage that stores program instructions; and
    a processor capable of executing the program instructions to cause the first wireless network to perform operations relating to a wireless communication device (WCD) having a radio connection with the first wireless network, the operations comprising:
      receiving from an interworking server an indication of an incoming call that the WCD can receive via a second wireless network;
      sending to the interworking server an indication of a location related to the WCD;
      receiving a selected control message from the interworking server; and
      determining whether to transition the WCD to the second wireless network to receive the incoming call based on the selected control message from the interworking server.

18. The system of claim 17, wherein the interworking server is configured to:
  determine a load level of the second wireless network in an area proximate the indicated location;
  select a control message from among at least a first control message and a second control message based on the load level; and
  send the selected control message to the first wireless network.

19. The system of 18, wherein determining whether to transition the WCD to the second wireless network to receive the incoming call based on the selected control message from the interworking server comprises:
- if the selected control message is the first control message, transitioning the WCD to the second wireless network; and
- if the selected control message is the second control message, maintaining the radio connection with the WCD instead of transitioning the WCD to the second wireless network.

20. The system of claim 18, wherein the interworking server is configured to determine the load of the second wireless network in the area proximate the indicated location based on respective load levels of one or more coverage areas of the second wireless network, wherein the one or more coverage areas encompass the indicated location.

* * * * *